United States Patent
Wickman

(10) Patent No.: US 9,954,827 B2
(45) Date of Patent: Apr. 24, 2018

(54) INVISIBLE TWO-FACTOR AUTHENTICATION

(71) Applicant: MobileFrame, LLC, Los Gatos, CA (US)

(72) Inventor: Glenn Ward Wickman, San Jose, CA (US)

(73) Assignee: MOBILEFRAME, LLC, Los Gatos, CA (US)

( * ) Notice: Subject to any disclaimer, the term of this patent is extended or adjusted under 35 U.S.C. 154(b) by 174 days.

(21) Appl. No.: 14/858,206

(22) Filed: Sep. 18, 2015

(65) Prior Publication Data

US 2016/0127328 A1    May 5, 2016

Related U.S. Application Data

(60) Provisional application No. 62/074,155, filed on Nov. 3, 2014.

(51) Int. Cl.
*H04L 29/00* (2006.01)
*H04L 29/06* (2006.01)

(52) U.S. Cl.
CPC ........ *H04L 63/0428* (2013.01); *H04L 63/062* (2013.01); *H04L 63/08* (2013.01)

(58) Field of Classification Search
CPC .... H04L 63/0428; H04L 63/062; H04L 63/08
See application file for complete search history.

(56) References Cited

U.S. PATENT DOCUMENTS

| | | | | |
|---|---|---|---|---|
| 2007/0022469 A1* | 1/2007 | Cooper | ................... | H04K 1/00 726/3 |
| 2011/0173447 A1* | 7/2011 | Zhang | ................... | H04B 3/542 713/168 |
| 2012/0089481 A1* | 4/2012 | Iozzia | ..................... | G06F 21/31 705/26.41 |
| 2012/0290830 A1* | 11/2012 | Resch | ................... | H04L 9/0841 713/150 |
| 2013/0159195 A1* | 6/2013 | Kirillin | ............... | G06Q 20/322 705/71 |
| 2013/0263240 A1* | 10/2013 | Moskovitch | ............ | G06F 21/32 726/7 |
| 2015/0113279 A1* | 4/2015 | Andersen | ............ | H04L 63/0457 713/171 |

* cited by examiner

*Primary Examiner* — Don Zhao
(74) *Attorney, Agent, or Firm* — Schwegman Lundberg & Woessner, P.A.

(57) ABSTRACT

In an example embodiment, invisible two factor authentication is performed by receiving, at a first machine, a registration request from a second machine, with the registration request encrypted using a common hash key. Then, in response to the receiving of the registration request, a server key is generated that is unique to the first machine and to the second machine. The registration request is responded to with the server key encrypted using the common hash key. Encrypted data is then received from the client machine, and this encrypted data is decrypted using the server key. In another example embodiment, in response to a determination that a data source has changed, incremental dynamic data processing is performed by identifying dynamic data relevant to records in the data source marked for distribution and, based on the existence of a state for each piece of dynamic data, marking the dynamic data for distribution.

15 Claims, 9 Drawing Sheets

US 9,954,827 B2

INVISIBLE TWO-FACTOR AUTHENTICATION

CROSS-REFERENCE TO RELATED APPLICATION

This application is a Non-Provisional of and claims the benefit of priority under 35 U.S.C. § 119(e) from U.S. Provisional Application Ser. No. 62/074,155, entitled "INVISIBLE TWO FACTOR AUTHENTICATION AND INCREMENTAL DYNAMIC DATA," filed on Nov. 3, 2014, which is hereby incorporated by reference herein in its entirety.

TECHNICAL FIELD

Embodiments of the present disclosure relate generally to increasing computer speed and security and, more particularly, but not by way of limitation, to invisible two factor authentication and incremental dynamic data.

BACKGROUND

Authentication is the process of identifying an individual, usually based on a username and password. In security systems, authentication is distinct from authorization, which is the process of giving individuals access to system objects based on their identity. Typically, authentication is performed with the full knowledge of the user. For example, the user may need to explicitly provide a user name and password in order to be authenticated. In other instances, a certificate or other key may need to be provided in order to be authenticated.

Additionally, once authentication has been completed and a data exchange session has begun, the system may have a need to synchronize data between a server and a client device. This can be performed by either performing full synchronization periodically (e.g., the entire data set is retransmitted to the client device), performing incremental synchronization periodically (e.g., only newly modified data is transmitted to the client device), or some combination of the two. Incremental synchronization, however, requires significant computing overhead to manage the monitoring of changes to the data set, track those changes, and coordinate synchronizations.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, invisible two-factor authentication is provided in a computer system. Invisible two-factor authentication describes a methodology for two or more devices to securely communicate to each other over a network, without any configuration, administration, or the user having to be aware of it. This lack of knowledge of the authentication is why it may be called "invisible."

Two factor authentication involves authentication of parties using two independent authentication factors. Possible authentication factors include a knowledge factor (e.g., something only the user knows), a possession factor (e.g., something only the user has), and an inherence factor (e.g., something only the user is). Each factor is validated by the other party in a communication in order for authentication to occur. For example, when a client talks to a server and a server talks to a client, there often must be some way for the client to ensure that the server is authentic and the server to ensure that the client is authentic. If each of these ways involve two factors, then it is known as two factor authentication.

One common possession factor involves the use of certificates. The exchange of certificates, however, is known to both parties of the communication, and thus is not invisible.

In an example embodiment, invisible two-factor authentication is performed such that when a client talks to a server, hashes are created at that point of contact. The hashes are only sent to the client one time. From that point on, the client hashes everything with that hash. The hashes can then be generated on the fly, whereas certificates are pregenerated and easily accessible (and thus hackable).

Additionally, because the hashes are generated, they can be different for each client, thereby providing an additional level of security (i.e., one client will be unable to access another's client's data that happens to be stored on a server that both clients have authorization to access).

Figure 1:
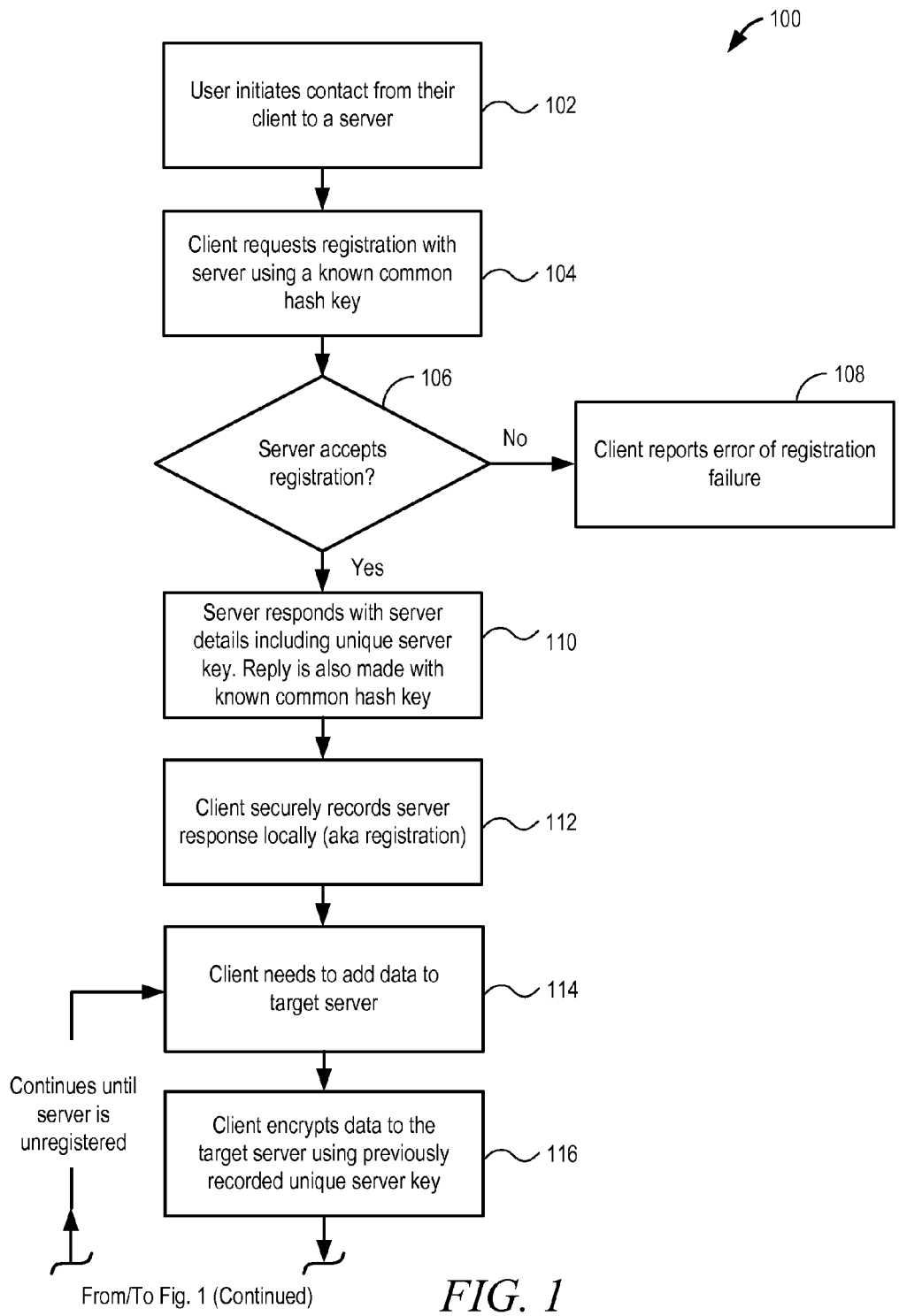
FIG. 1 is a flow diagram illustrating a method, in accordance with an example embodiment, of invisible two-factor authentication.
Figure 1:
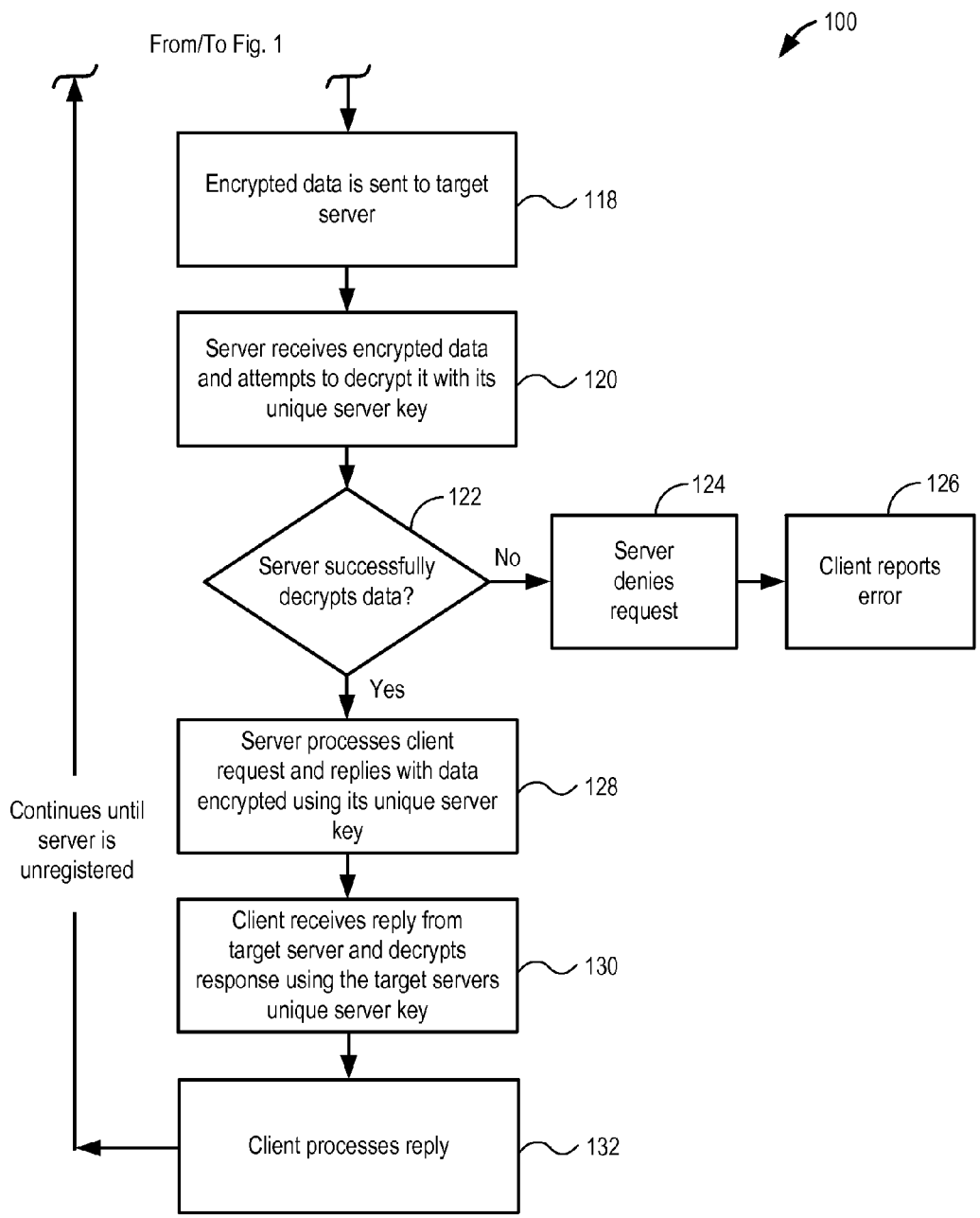

FIG. 1 is a flow diagram illustrating a method 100, in accordance with an example embodiment, of invisible two-factor authentication. At operation 102, the user initiates contact from their client to a server. It should be noted that the terms "client" and "server" are used in this description but the same method can be utilized between any two parties, including, for example, two peers. At operation 104, the client requests registration with the server using a known common hash key. The hash key may be a reference to a known hash table that is accessible to both parties (e.g., both the server and the client). A number of different types of known common hash keys may be utilized at this operation. In one example embodiment, a user identification may be used as a known common hash key. In another example embodiment, a status code may be used as a known common hash key. In another example embodiment, a creation date for an item may be used as a known common hash key. In another example embodiment, a device identification may be used as a known common hash key.

At operation 106, it is determined if the server accepts the registration. If not, then at operation 108, the client reports an error of registration. If so, then at operation 110, the server responds with server details, including a unique server key. The reply is also made with a known common hash key. At operation 112, the client securely records the server response locally (also known as registration).

At operation 114, the client then needs to send data to the target server. At operation 116, the client encrypts the data using the previously recorded unique server key. At operation 118, the encrypted data is sent to the target server. At operation 120, the server receives the encrypted data and attempts to decrypt it with its unique server key. At operation 122, it is determined if the server successfully decrypted the data. If not, then at operation 124, the server denies the request and at operation 126, the client reports an error. If so, then at operation 128, the server processes the client request and replies with data encrypted using its unique server key. At operation 130, the client receives the reply from the target server and decrypts the response using the target server's unique server key. At operation 132, the client processes the reply. The process of operations 114-132 can then be repeated any time data needs to be sent from the client to the target server, until the server is unregistered.

Registration is the term given to the process of allowing communication to the server. Once registered, the client is allowed to communicate to the server. The reply back from a successful registration is the only time the unique server key is transmitted. A common hash key is only used during this one-time process; all further communications are secured using the unique server key.

Communication is the term given to any transmissions between the client and the server. Note that the unique server key is only used to encrypt and decrypt the communication data, and is never itself transmitted after use.

"Key" is a generic term used to describe any information used to encrypt and decrypt the data. Any encryption methodology may be used. In one example embodiment, a hash methodology is used.

Additional options and/or augmentations may be applied and/or made to the process described above. These additions and/or augmentations are not mutually exclusive and can be combined into multiple combinations to be applied to the basic process described above.

In an example embodiment, shared key registration may be used. Here, the client can optionally capture a shared key that the server requires. This key may be, for example, a password, and is defined by the administrator of the server and stored on the server. The server may then verify that the shared key is correct and deny the ability for a client who does not know the key to register to it.

In an example embodiment, per-client unique server key generation may be used. Here, the server may generate a unique key per client and retain a dictionary of assigned keys. The server then receives encrypted data and attempts to decrypt it using the key that was last assigned to the client. When the client unregisters, the target server details, including the unique server key, are also unregistered.

In an example embodiment, dynamic unique server key generation is utilized. Here, the server responds with server details including a current unique server key. In another sub-embodiment, on a fixed interval or on demand, the server changes its unique server key. When the client unregisters, the target server details, including the last unique server key, are also unregistered.

In an example embodiment, a zero tolerance option is provided. Here, the client unregisters target server information and quits and, optionally, the client bans attempts to register with the same server for a fixed time or allows only a set number of attempts.

In an example embodiment, spoof protection through coordinated verification is provided. Here, the client's encrypted request includes a timestamp or some other coordinated identifier(s). The server verifies that the decrypted request's timestamp occurred before its own current date/time (with reasonable drift accommodation) or the other coordinated identifier(s). If the tests fail, the request is considered invalid and is rejected. If the tests succeed, the reply is created also with a timestamp or coordinated identifier(s). The client verifies the decrypted reply's timestamp or coordinated identifiers before processing.

In an example embodiment, spoof protection through salting is provided. A salt is a second password or hash key used to either modify the original hash key or re-encrypt the encrypted output a second time. The client's encrypted request includes a salt key that is fixed or randomly generated with each request. The server encrypts its reply using the salt factor provided by the client's request. The salt can be applied to the unique server key prior to encryption or used to re-encrypt the encrypted reply a second time. The client uses the salt it provided in the request to decrypt the reply in the same manner (ensuring it is actually the reply to the request it sent).

Figure 2:
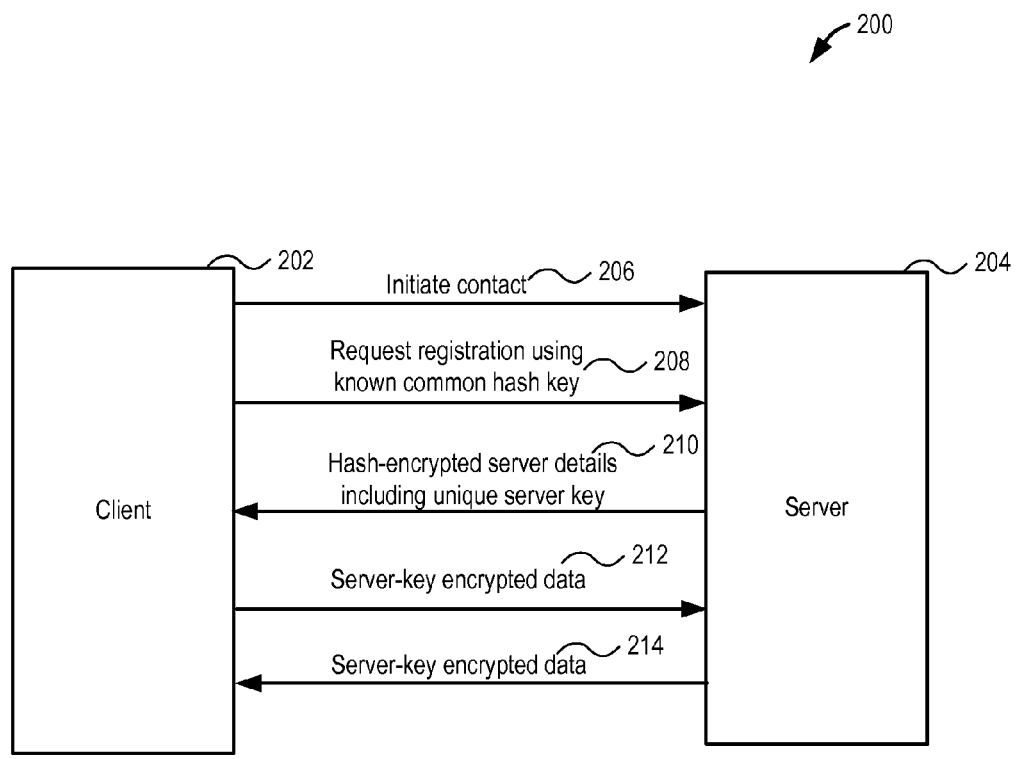
FIG. 2 is a block diagram illustrating a method, in accordance with an example embodiment, of invisible two-factor authentication.

FIG. 2 is a block diagram illustrating a method 200, in accordance with an example embodiment, of invisible two-factor authentication. Here, communication between a client 202 and a server 204 is depicted but, as described earlier, embodiments are foreseen where the communication occurs between any two devices, such as between two peer devices. At operation 206, contact is initiated between the client 202 and the server 204. It should be noted that while this figure depicts the contact as being initiated by the client 202, the contact may be initiated by the server 204 in other example embodiments.

At operation 208, a registration request is sent. This may be sent as encrypted using a known common hash key. Details of the common hash key are described above with respect to FIG. 1. The known common hash key acts as a first factor in the two-factor authentication.

Assuming the server 204 accepts the registration, at operation 210, the server 204 responds with server details, encrypted using the common hash key. These details include a unique server key. The client 202 then securely records the server response locally (i.e., registration of the server with the client). When the client 202 needs to communicate with the server 204, the client 202 encrypts data (for example, a request for a piece of information from the server 204, or data to be stored on the server 204) using the previously recorded unique server key and, at operation 212, sends the server-key encrypted data to the server 204. The server receives this encrypted data and decrypts it with its unique server key. Thus, even if the communication is intercepted by another server (or simply accidentally passed to another server), that other server will not be able to decrypt the communication from the client 202. Assuming decryption is successful, the server 204 handles the communication (e.g., services whatever is requested) and generates a reply. This reply is then encrypted by the server 204 using the unique server key and, at operation 214, sent to the client 202. The client 202 can then decrypt this communication using the unique server key. Thus, even if the communication is intercepted by another client (or simply accidentally passed to another client), that other client will not be able to decrypt the communication from the client.

Notably, all of this is handled without needing to involve the user at all; hence, the process is "invisible."

Turning now to incremental dynamic data, dynamic data is the term given to a methodology for defining subsets of data, their relationship to a distribution entity (like a user or device), and a frequency in which the subset should be reevaluated. As such, dynamic data allows a server to manage data sets for distribution to different people. Thus, for example, work orders can be distributed in a way such that only the work orders pertaining to a particular user are distributed to that user.

Figure 3:
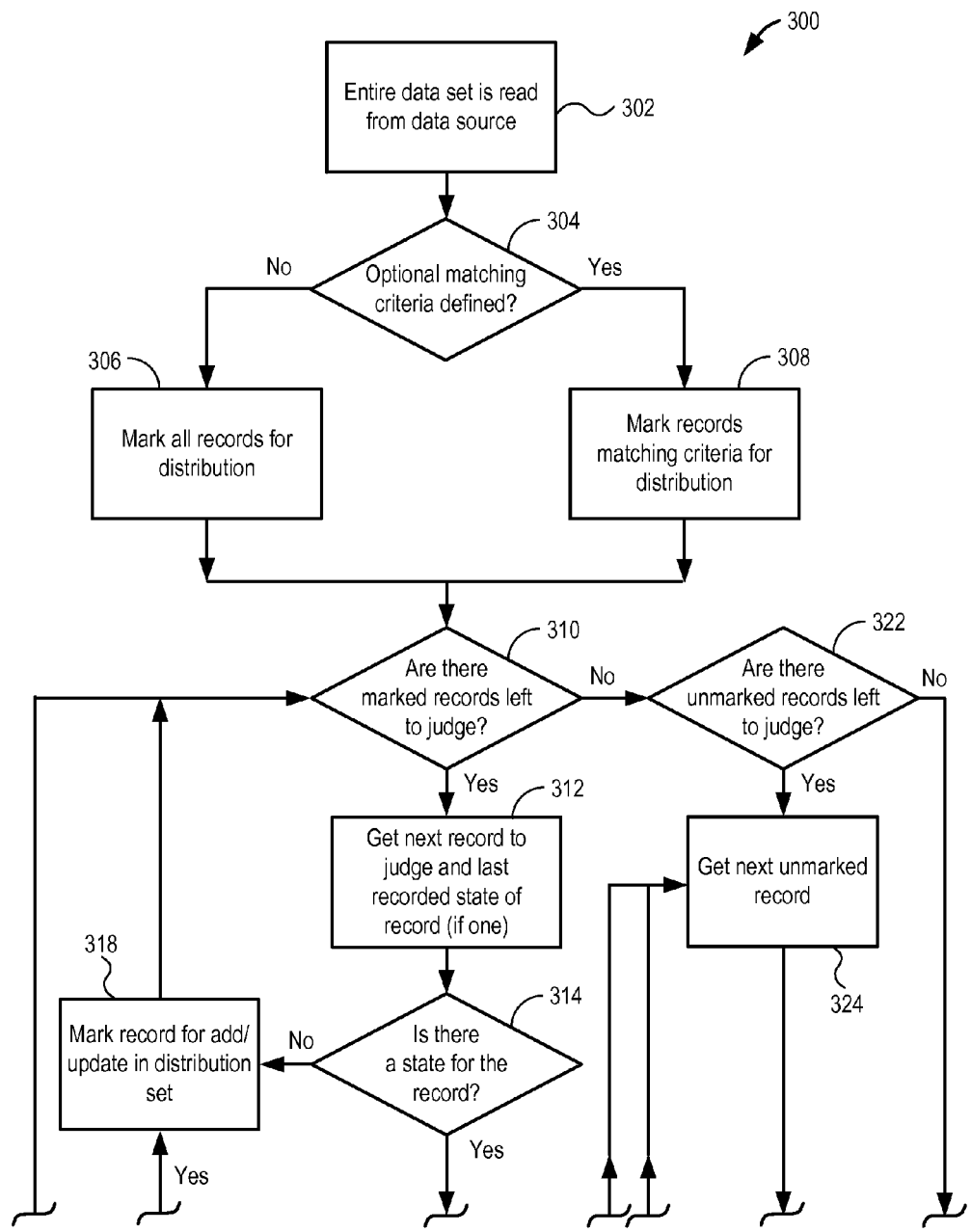
FIG. 3 is a flow diagram illustrating a method, in accordance with an example embodiment, of processing an entire data set.
Figure 3:
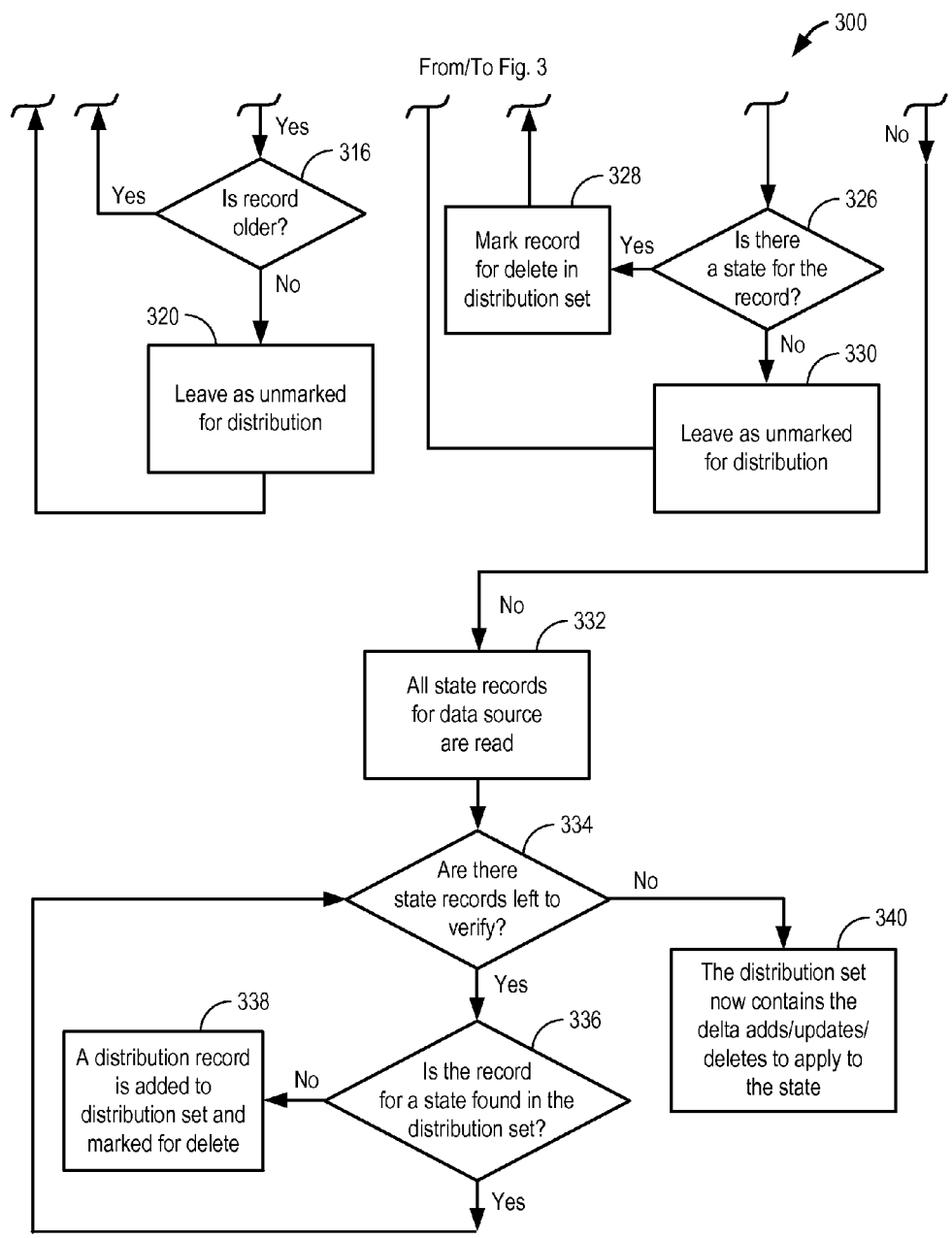

FIG. 3 is a flow diagram illustrating a method 300, in accordance with an example embodiment, of processing an entire data set. At operation 302, the entire data set is read from the system. At operation 304, it is determined if optional matching criteria has been defined. If not, then at operation 306, all records are marked for distribution. If so, then at operation 308, just the records matching the criteria are marked for distribution. At operation 310, it is determined if there are marked records left to judge. If so, then at operation 312, the next record to judge is obtained as well as the last recorded state of the record (if any). At operation 314, it is determined if there is a state for the record. If so, then at operation 316, it is determined if the record is older. This may be determined by examining the age of the record and comparing the age to a predetermined threshold. If so, or if at operation 314 it was determined there was no state for the record, then at operation 318, the record is marked for add/update in the distribution set. If, at operation 316, it is determined that the record is not older, then at operation 320, the record is left as marked for distribution. The process then returns to operation 310.

Once all the marked records have been judged, at operation 322, it is determined if there are any unmarked records left to judge. If so, then at operation 324, the next unmarked record is obtained. At operation 326, it is determined if there is a state for the record. If not, then at operation 328, the record is marked for deletion in the distribution set. If so, then at operation 330, the record is left as unmarked for distribution.

Once all of the unmarked records have been judged, at operation 332, all state records for the data source are read. Then at operation 334, it is determined if there are state records left to verify. If so, then at operation 336, it is determined if the record for a state is found in the distribution set. If not, then at operation 338, a distribution record is added to the distribution set and marked for deletion. Then, or if at operation 336 it was determined that the record was not for a state found in the distribution set, the process returns to operation 334. Once all state records have been verified, then at operation 340, the distribution set now contains the delta add/updates/deletes to apply to the state. The changes may then be applied and the corresponding states updated.

As an example, assume simple data set called "CUSTOMERS" as follows:

| CUSTOMERS | | | |
|---|---|---|---|
| ID | LAST_UPDATE | NAME | STATE |
| 0 | Jan. 1, 2000 | Bob | CA |
| 1 | Jan. 1, 2000 | Susan | CA |
| 2 | Jan. 1, 2000 | Mary | FL |
| 3 | Jan. 1, 2000 | Jeff | NY |

If the system were to create a dynamic data entry to deploy CUSTOMERS in California (CA), the criteria might look something like this:
Deploy CUSTOMERS where Customers.STATE='CA'

The first time the dynamic data entries are processed, the entire data set might be processed, as follows. First, the CUSTOMERS data set would be located and all four CUSTOMER records would be loaded into memory. Then, all four of the records would be processed and the criteria evaluated. Those records matching the criteria may be marked for distribution. At the end of this processing, the distribution set might look like this:

| ID | LAST_UPDATE | DISTRIBUTE |
|---|---|---|
| 0 | Jan. 1, 2000 | Y |
| 1 | Jan. 1, 2000 | Y |
| 2 | Jan. 1, 2000 | N |
| 3 | Jan. 1, 2000 | N |

No existing state information would be found since this is the first processing. In a first operation, Records 0 and 1 do not exist in the state since there is no state. They are all kept in the distribution set. In a second operation, Records 2 and 3 do not exist in the state since there is no state. They are ignored. After this process, the distribution set looks like this:

| ID | LAST_UPDATE | DISTRIBUTE |
|---|---|---|
| 0 | Jan. 1, 2000 | Y |
| 1 | Jan. 1, 2000 | Y |
| 2 | Jan. 1, 2000 | IGNORE |
| 3 | Jan. 1, 2000 | IGNORE |

In a third operation, there is still no state. The delta set would include the two additions for record 0 and 1. After applying those, they would be added to the known state information. This state would look something like this:

| CUSTOMERS (STATE) | |
|---|---|
| ID | LAST_UPDATE |
| 0 | Jan. 1, 2000 |
| 1 | Jan. 1, 2000 |

This example shows how processing an initial data set with dynamic data would look.

Assuming no changes have been made to the CUSTOMERS data, if the system were to process the dynamic data entry again by processing the entire set, the system would:
1. Find the CUSTOMERS data set and load all four CUSTOMER records into memory.
2. Process through all four records and evaluate the criteria. For those records matching the criteria, they would be marked for distribution. At the end of this processing, the distribution set would again look like this:

| ID | LAST_UPDATE | DISTRIBUTE |
|----|-------------|------------|
| 0  | Jan. 1, 2000 | Y |
| 1  | Jan. 1, 2000 | Y |
| 2  | Jan. 1, 2000 | N |
| 3  | Jan. 1, 2000 | N |

3. The existing state information would be loaded:

| CUSTOMERS (STATE) | |
|----|-------------|
| ID | LAST_UPDATE |
| 0  | Jan. 1, 2000 |
| 1  | Jan. 1, 2000 |

4. In a first operation, Records 0 and 1 both are marked for distribution, exist in the state already, and have the same date. Therefore, they are ignored for distribution (since the exact same record already has been deployed). At the end of this process, the distribution set would look like this:

| ID | LAST_UPDATE | DISTRIBUTE |
|----|-------------|------------|
| 0  | Jan. 1, 2000 | IGNORE |
| 1  | Jan. 1, 2000 | IGNORE |
| 2  | Jan. 1, 2000 | N |
| 3  | Jan. 1, 2000 | N |

5. In a second operation, Records 2 and 3 are not marked for distribution, and also do not exist in the state already so they are also ignored for distribution (since the record was never deployed anyway). At the end of this process, the distribution set would look like this:

| ID | LAST_UPDATE | DISTRIBUTE |
|----|-------------|------------|
| 0  | Jan. 1, 2000 | IGNORE |
| 1  | Jan. 1, 2000 | IGNORE |
| 2  | Jan. 1, 2000 | IGNORE |
| 3  | Jan. 1, 2000 | IGNORE |

6. In a third operation, records 0 and 1 in the state both exist in the data set/distribution set, so no changes occur to either the state or the distribution set.
7. The delta set contains no changes as everything is ignored. There would be no changes to the state. The (unchanged) state information continues to look like this:

| CUSTOMERS (STATE) | |
|----|-------------|
| ID | LAST_UPDATE |
| 0  | Jan. 1, 2000 |
| 1  | Jan. 1, 2000 |

As can be seen in this example, given no changes, effectively nothing happens. There are no delta changes to apply and no changes to the state occur even though the entire dynamic data was reprocessed. However, this is different if one or more records in the data set have changed. For example, assume that Jeff moved from New York (N.Y.) to CA on Feb. 2, 2000 and that Susan died and was therefore removed as a customer to the business. Assume also that on Mar. 3, 2000, the business gained a new customer, Tim, who lives in CA. After these events, the data set would look something like this:

| CUSTOMERS | | | |
|----|-------------|------|-------|
| ID | LAST_UPDATE | NAME | STATE |
| 0  | Jan. 1, 2000 | Bob  | CA |
| 2  | Jan. 1, 2000 | Mary | FL |
| 3  | Feb. 2, 2000 | Jeff | CA |
| 4  | Mar. 3, 2000 | Tim  | CA |

If the system were to process the dynamic data entry again by processing the entire set, it would:
1. Find the CUSTOMERS data set and load the four CUSTOMER records into memory.
2. Process through all four records and evaluate the criteria. The records matching the criteria would be marked for distribution. At the end of this processing, the distribution set would look like this:

| ID | LAST_UPDATE | DISTRIBUTE |
|----|-------------|------------|
| 0  | Jan. 1, 2000 | Y |
| 2  | Jan. 1, 2000 | N |
| 3  | Feb. 2, 2000 | Y |
| 4  | Mar. 3, 2000 | Y |

3. The system would load the existing state information, which from the previous processing still looks like this:

| CUSTOMERS (STATE) | |
|----|-------------|
| ID | LAST_UPDATE |
| 0  | Jan. 1, 2000 |
| 1  | Jan. 1, 2000 |

4. In a first operation, Record 0 exists in the state and is the same age, so it is ignored. Records 2, 3, and 4 do not exist in the state so they are kept. At the end of this process, the distribution set would look like this:

| ID | LAST_UPDATE | DISTRIBUTE |
|----|-------------|------------|
| 0  | Jan. 1, 2000 | IGNORE |
| 2  | Jan. 1, 2000 | N |
| 3  | Feb. 2, 2000 | Y |
| 4  | Mar. 3, 2000 | Y |

5. In a second operation, Record 2 is not marked for distribution and also does not exist in the state already so it is ignored for distribution. At the end of this process, the distribution set would look like this:

| ID | LAST_UPDATE | DISTRIBUTE |
|----|-------------|------------|
| 0  | Jan. 1, 2000 | IGNORE |
| 2  | Jan. 1, 2000 | IGNORE |

-continued

| ID | LAST_UPDATE | DISTRIBUTE |
|----|-------------|------------|
| 3  | Feb. 2, 2000 | Y |
| 4  | Mar. 3, 2000 | Y |

6. In a third operation, Record 0 exists in both the data set and distribution set, so no changes occur to the state. Record 1 in the state does not exist in the data set/distribution set, so it is marked for removal. At the end of this process, the distribution set would look like this:

| ID | LAST_UPDATE | DISTRIBUTE |
|----|-------------|------------|
| 0  | Jan. 1, 2000 | IGNORE |
| 2  | Jan. 1, 2000 | IGNORE |
| 3  | Feb. 2, 2000 | Y |
| 4  | Mar. 3, 2000 | Y |
| 1  | NULL        | REMOVE |

7. The delta set contains two new additions for records 3 and 4 and a removal for Record 1. After these deltas are applied and the state is updated, the state would look something like this:

| CUSTOMERS (STATE) | |
|---|---|
| ID | LAST_UPDATE |
| 0 | Jan. 1, 2000 |
| 3 | Feb. 2, 2000 |
| 4 | Mar. 3, 2000 |

This example shows how the process will pick up additions and deletions to the underlying data set in order to create just the deltas.

Through these examples, one can see that processing dynamic data when re-evaluating the entire set always results in a set of deltas that indicate what changes need to be made in order to create/update the desired dataset on the target.

However, this can be a very costly process from a processing standpoint if a large data set needs to be evaluated on a high frequency with minimal changes. Since the entire data set must be reviewed and effectively compared against all state information, it requires lots of memory and processing for what may end up being a small amount of calculated changes.

Incremental dynamic data describes a methodology that expands on the dynamic data concept to include the ability to update an already evaluated subset based on incremental changes to the full set without having to reevaluate the entire set. This may be performed based on a single change to the data set. This is in contrast to basing dynamic data on timing. For example, with a timing embodiment, an administrator may want to pick every single work order in a table that is open and distribute them to only those departments that are indicated on the corresponding work orders. When a record gets changed, such as when one user in the field finishes a work order and sends an indication as such, thereby marking that work order as complete, that change is not realized by the system until that dynamic data is completely reevaluated (e.g. polled again). Problems are encountered in that administrators need to set up how often polling must occur, balancing between efficiency (e.g., polling a million records is time consuming) and effectiveness (e.g., polling more often results in more up-to-date distribution).

Thus, in an example embodiment, when a change is made to the data, the system automatically goes back to the dynamic data that would have affected that changed data, and goes back and process the changes for those additional pieces of data (the delta).

A record may be an instance of a data item, such as a data record from a table or a view. A data set may be the full set of potential records for distribution. A distribution set may be the subset of the data set records determined to have some importance to the changes to distribute. A state set may be the persisted or generated last known state of the data set. In other words, a state set may be what the target systems currently contain. A delta set may be the set of records to distribute along with an indicator to add, update, or delete to the state. In effect, a delta set may be the difference between the state and the distribution set.

The user may begin by defining a data source such as a table or video and the criteria to define the full potential set for distribution. The user may also optionally define a column value-to-user/device match. For example, when the department column matches the user's department, as described above, then the entire data set can be processed.

Figure 4:
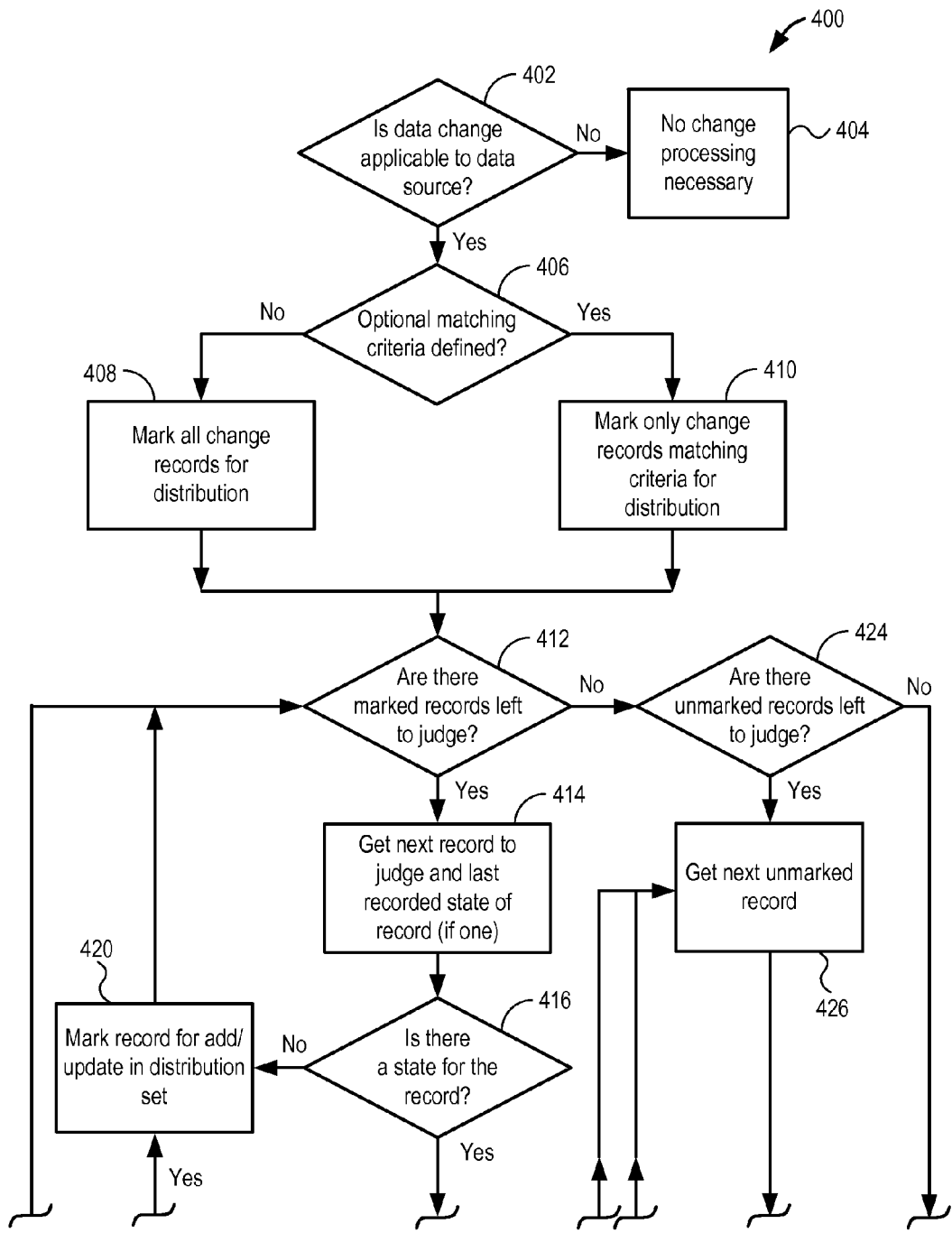
FIG. 4 is a flow diagram illustrating a method, in accordance with an example embodiment, of processing an incremental data change.
Figure 4:
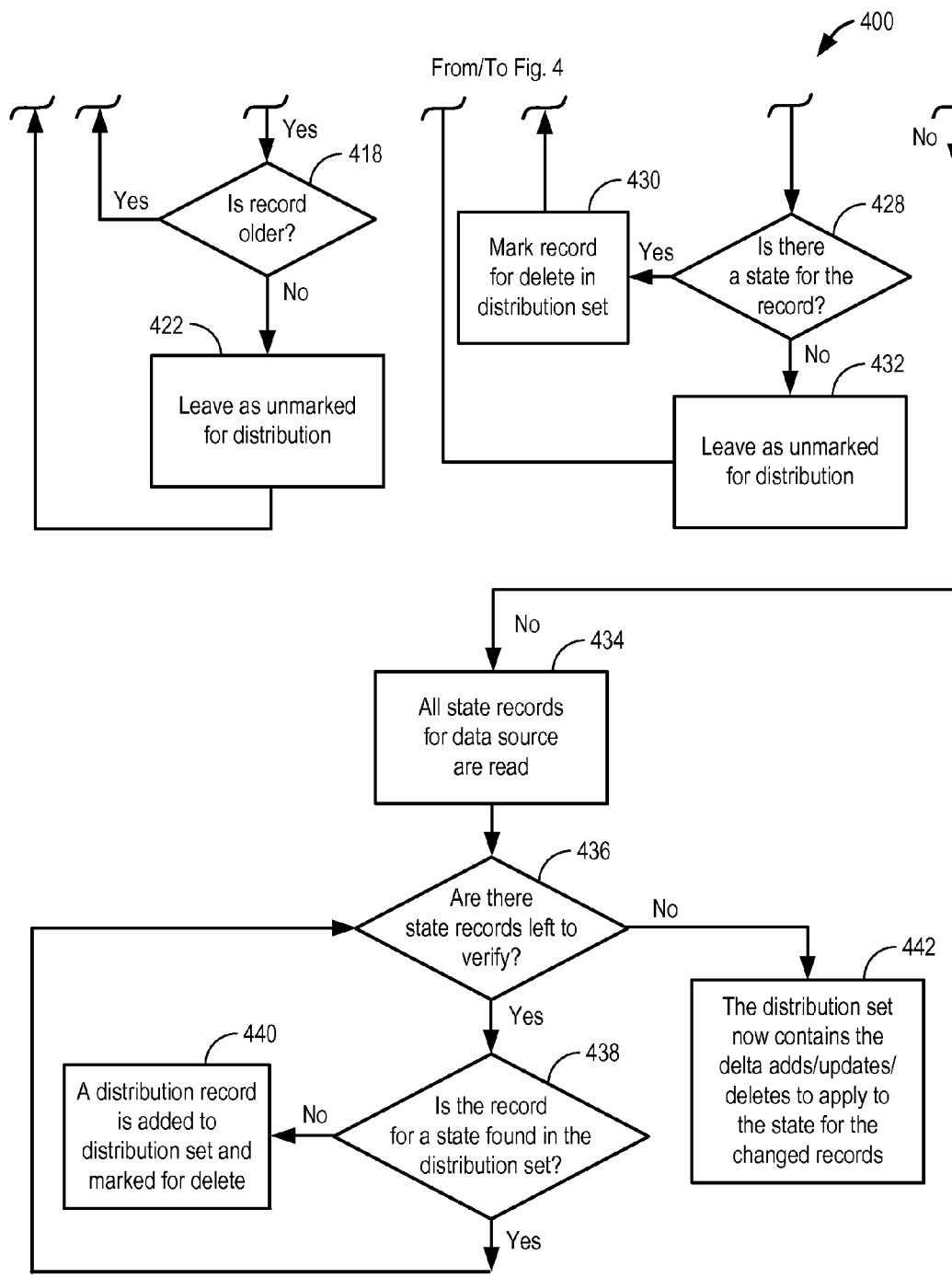

FIG. 4 is a flow diagram illustrating a method 400, in accordance with an example embodiment, of processing an incremental data change. At operation 402, it is determined if a data change is applicable to a data source. This essentially tells the system whether the dynamic data change is relevant to a particular record of interest (i.e., would have affected it). If not, then at operation 404, no change processing is necessary. If so, then at operation 406, it may be determined if optional matching criteria has been defined. If not, then all changed records are marked for distribution at operation 408. If so, then at operation 410, only change records matching the criteria are marked for distribution.

At operation 412, it is determined if there are marked records left to judge. If so, then at operation 414, the next record to judge is obtained as well as the last recorded state of the record (if any). At operation 416, it is determined if there is a state for the record. If so, then at operation 418, it is determined if the record is older. This may be determined by examining the age of the record and comparing the age to a predetermined threshold. If so, or if at operation 416 it was determined there was no state for the record, then at operation 420, the record is marked for add/update in the distribution set. If at operation 418 it is determined that the record is not older, then at operation 422, the record is left as marked for distribution. The process then returns to operation 412.

Once all the marked records have been judged, at operation 424, it is determined if there are any unmarked records left to judge. If so, then at operation 426, the next unmarked record is obtained. At operation 428, it is determined if there is a state for the record. If not, then at operation 430, the record is marked for deletion in the distribution set. If so, then the record is left as unmarked for distribution at operation 432.

Once all of the unmarked records have been judged, at operation 434, all state records for the data source are read. It should be noted that in an example embodiment this operation may be modified to only be performed on state records of dynamic data that is "applicable to the data source" as determined in operation 402. In other words, only those state records pertaining to dynamic data that would affect a particular record are read and analyzed here in such an optional example embodiment.

Then at operation 436, it is determined if there are state records left to verify. If so, then at operation 438, it is determined if the record for a state id found in the distribution set. If not, then at operation 440, a distribution record is added to the distribution set and marked for deletion. Then, or if at operation 438 it was determined that the record was not for a state found in the distribution set, the process returns to operation 436. Once all state records have been verified, then at operation 442, the distribution set now contains the delta adds/updates/deletes to apply to the state for the changed records.

As an example, building off the previous example, assume there is a CUSTOMERS data set that currently looks like this:

| CUSTOMERS | | | |
|---|---|---|---|
| ID | LAST_UPDATE | NAME | STATE |
| 0 | Jan. 1, 2000 | Bob | CA |
| 2 | Jan. 1, 2000 | Mary | FL |
| 3 | Feb. 2, 2000 | Jeff | CA |
| 4 | Mar. 3, 2000 | Tim | CA |

The dynamic data entry remains the same, that is, to deploy CUSTOMERS in CA. As a reminder, the criteria might look something like this:
Deploy CUSTOMERS where Customers.STATE='CA'

Assume a single change occurs. On Apr. 4, 2000, Bob decided to go by his given name of William. After updating his record in the data set, the data set now looks like this:

| CUSTOMERS | | | |
|---|---|---|---|
| ID | LAST_UPDATE | NAME | STATE |
| 0 | Apr. 4, 2000 | William | CA |
| 2 | Jan. 1, 2000 | Mary | FL |
| 3 | Feb. 2, 2000 | Jeff | CA |
| 4 | Mar. 3, 2000 | Tim | CA |

The changed record information is sent to the incremental dynamic data processing. In this case, the changed record is:

| CUSTOMERS | | | | |
|---|---|---|---|---|
| ID | LAST_UPDATE | NAME | STATE | OPERATION |
| 0 | Apr. 4, 2000 | William | CA | UPDATED |

In order to process the dynamic data incrementally in response to the record change, the system follows these steps:
1. The record is, in fact, for the CUSTOMERS table, which matches this dynamic data definition. Had this not been true, processing would have stopped as the changed record does apply to this dynamic data definition. The record also matches the criteria (the STATE is equal to CA) so it is included in the distribution set. At this point, the distribution set looks like this:

| ID | LAST_UPDATE | DISTRIBUTE |
|---|---|---|
| 0 | Apr. 4, 2000 | Y |

2. The state information for this record is loaded. This is:

| CUSTOMERS (STATE) | |
|---|---|
| ID | LAST_UPDATE |
| 0 | Jan. 1, 2000 |

3. At operation 418, it is determined that the record exists in the distribution set, but the state is older (the LAST_UPDATE in the state is Jan. 1, 2000 where the distribution set record shows Apr. 4, 2000). As such, the record is kept in the distribution set at operation 420.
4. At operation 424, it is determined that there are no unmarked records for distribution.
5. At operation 428, it is determined that the state record 0 does exist in the data/distribution set. No changes occur at operation 432.
6. The delta set contains one update, which is contained in the distribution set at operation 442. Once applied and the state updated, will look like this:

| CUSTOMERS (STATE) | |
|---|---|
| ID | LAST_UPDATE |
| 0 | Apr. 4, 2000 |
| 3 | Feb. 2, 2000 |
| 4 | Mar. 3, 2000 |

This example shows a basic single-record update when processing incrementally. As can be seen, this processing of a single update uses minimal amounts of memory to determine the same things that processing the entire set would do.

In another example, assume two records have changed. William has died on May 5, 2000 and has been removed as a customer to the business. At the same time, a new customer was added named Barbara who lives in CA. After updating the data set with these events, the data set now looks like this:

| CUSTOMERS | | | |
|---|---|---|---|
| ID | LAST_UPDATE | NAME | STATE |
| 2 | Jan. 1, 2000 | Mary | FL |
| 3 | Feb. 2, 2000 | Jeff | CA |
| 4 | Mar. 3, 2000 | Tim | CA |
| 5 | May 5, 2000 | Barbara | CA |

The changed information is sent to the dynamic data processing. In this case, the changes are:

| ID | LAST_UPDATE | NAME | STATE | OPERATION |
|---|---|---|---|---|
| 0 | Apr. 4, 2000 | William | CA | DELETED |
| 5 | May 5, 2000 | Barbara | CA | ADDED |

In order to process the dynamic data incrementally in response to the record change, the system follows these steps:
1. The records are, in fact, for the CUSTOMERS table, which matches this dynamic data definition. Record 0 matches the criteria, but was DELETED so it is implicitly not included in the distribution set. The added record also matches the criteria (the STATE is equal to CA) so it is included in the distribution set. At this point, the distribution set looks like this:

| ID | LAST_UPDATE | DISTRIBUTE |
|---|---|---|
| 0 | Apr. 4, 2000 | N |
| 5 | May 5, 2000 | Y |

2. The state information for the changed records is loaded. Since record 5 is new, the system only gets back the state for 0:

| CUSTOMERS (STATE) | |
|---|---|
| ID | LAST_UPDATE |
| 0 | Apr. 4, 2000 |

3. At operation 416, it is determined that the record 5 does not exist in the state so it is kept in the distribution set at operation 420.
4. At operation 416, it is determined that record 0 exists in the state, but is marked not to distribute to it is marked for removal. The distribution set now looks like this:

| ID | LAST_UPDATE | DISTRIBUTE |
|---|---|---|
| 0 | Apr. 4, 2000 | REMOVE |
| 5 | May 5, 2000 | Y |

5. The state record 0 is included in the distribution set (even though it is marked for removal).
6. The delta set contains two changes: one remove operation and one add/update. Once applied and the state updated, the state looks like this:

| CUSTOMERS (STATE) | |
|---|---|
| ID | LAST_UPDATE |
| 3 | Feb. 2, 2000 |
| 4 | Mar. 3, 2000 |
| 5 | May 5, 2000 |

Assume now another change to Mary. Her state will be changed to NY on Jun. 6, 2000. After the change, the data set looks like this:

| CUSTOMERS | | | |
|---|---|---|---|
| ID | LAST_UPDATE | NAME | STATE |
| 2 | Jun. 6, 2000 | Mary | NY |
| 3 | Feb. 2, 2000 | Jeff | CA |
| 4 | Mar. 3, 2000 | Tim | CA |
| 5 | May 5, 2000 | Barbara | CA |

The changed information is sent to the dynamic data processing. In this case, the changes are:

| ID | LAST_UPDATE | NAME | STATE | OPERATION |
|---|---|---|---|---|
| 2 | Jun. 6, 2000 | Mary | NY | UPDATED |

In order to process the dynamic data incrementally in response to the record change, the system follows these steps:

1. The record is, in fact, for the CUSTOMERS table, which matches this dynamic data definition. Record 2 does not match the criteria however so it is not included for distribution. At this point, the distribution set looks like this:

| ID | LAST_UPDATE | DISTRIBUTE |
|---|---|---|
| 2 | Jun. 6, 2000 | N |

2. The state information for all changed records is loaded. Since record 2 does not exist in the state we get no state back; thus, at operation 428, it is determined that the process should move to operation 432 and no record is marked for distribution.
3. At operation 428, it is determined that Record 2 does not exist in the state, so it is ignored. The distribution set now looks like this:

| ID | LAST_UPDATE | DISTRIBUTE |
|---|---|---|
| 2 | Jun. 6, 2000 | IGNORE |

4. At operation 434, it is determined that all state records are read, since there are no state records.
5. The delta set contains no changes as everything is ignored. There would be no changes to the state. The (unchanged) state information continues to look like this:

| CUSTOMERS (STATE) | |
|---|---|
| ID | LAST_UPDATE |
| 3 | Feb. 2, 2000 |
| 4 | Mar. 3, 2000 |
| 5 | May 5, 2000 |

This example shows how even changes made to records that would not match the dynamic data criteria can be processed incrementally without fault.

These incremental examples illustrate how the system can take a dynamic data entry and still calculate accurate deltas without having to load the entire data set or load the entire state set. This incremental approach allows for much faster realization of dynamically changing data sets by limiting memory and processing time.

In an example embodiment, the concepts of invisible two factor authentication and incremental dynamic data updating can be combined into a single embodiment. Here, the invisible two factor authentication can be used to authenticate a server and a client, where the server then performs the incremental dynamic data updating to distribute changed records to the client.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-4 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 5:
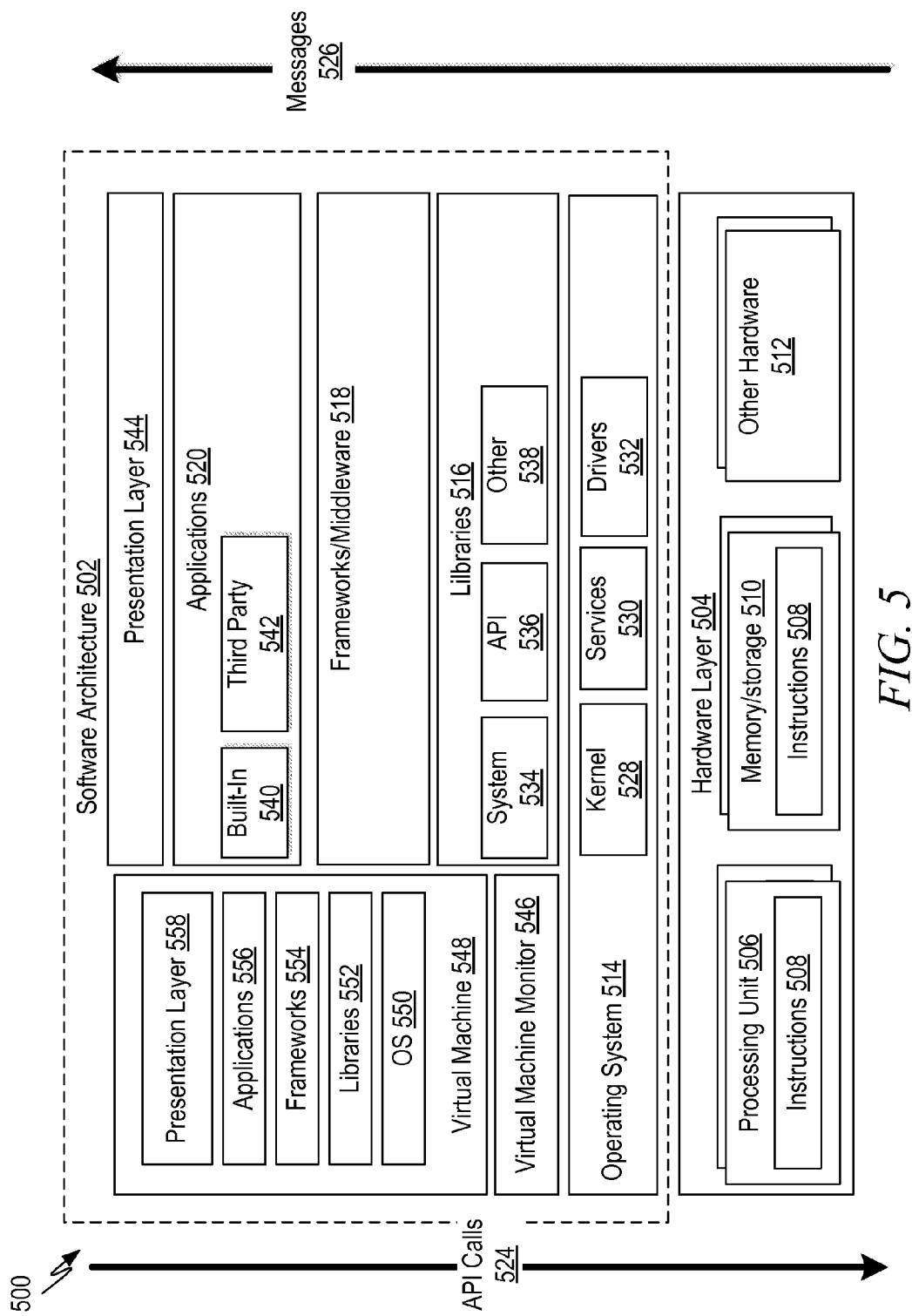
FIG. 5 is a block diagram illustrating a representative software architecture, which may be used in conjunction with various hardware architectures herein described.

FIG. 5 is a block diagram 500 illustrating a representative software architecture 502, which may be used in conjunction with various hardware architectures herein described. FIG. 5 is merely a non-limiting example of a software architecture and it will be appreciated that many other architectures may be implemented to facilitate the functionality described herein. The software architecture 502 may be executing on hardware such as machine 600 of FIG. 6 that includes, among other things, processors 610, memory 630, and I/O components 640. A representative hardware layer 504 is illustrated and can represent, for example, the machine 600 of FIG. 6. The representative hardware layer 504 comprises one or more processing units 506 having associated executable instructions 508. Executable instructions 508 represent the executable instructions of the software architecture 502, including implementation of the methods, modules, and so forth of FIGS. 1-4. Hardware layer 504 also includes memory and/or storage modules 510, which also have executable instructions 508. Hardware layer 504 may also comprise other hardware as indicated by 512, which represents any other hardware of the hardware layer 504, such as the other hardware illustrated as part of machine 600.

In the example architecture of FIG. 5, the software 502 may be conceptualized as a stack of layers where each layer provides particular functionality. For example, the software 502 may include layers such as an operating system 514, libraries 516, frameworks/middleware 518, applications 520 and presentation layer 544. Operationally, the applications 520 and/or other components within the layers may invoke API calls 524 through the software stack and receive a response, returned values, and so forth illustrated as messages 526 in response to the API calls 524. The layers illustrated are representative in nature and not all software architectures have all layers. For example, some mobile or special purpose operating systems may not provide a frameworks/middleware layer 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be utilized by the applications 520 and/or other components and/or layers. The libraries 516 typically provide functionality that allows other software modules to perform tasks in an easier fashion than to interface directly with the underlying operating system 514 functionality (e.g., kernel 528, services 530 and/or drivers 532). The libraries 516 may include system 534 libraries (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be utilized by the applications 520 and/or other software components/modules. For example, the frameworks 518 may provide various graphic user interface (GUI) functions, high-level resource management, high-level location services, and so forth. The frameworks 518 may provide a broad spectrum of other APIs that may be utilized by the applications 520 and/or other software components/modules, some of which may be specific to a particular operating system or platform.

The applications 520 include built-in applications 540 and/or third party applications 542. Examples of representative built-in applications 540 may include, but are not limited to, a contacts application, a browser application, a book reader application, a location application, a media application, a messaging application, and/or a game application. Third party applications 542 may include any of the built in applications as well as a broad assortment of other applications. In a specific example, the third party application 542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 542 may invoke the API calls 524 provided by the mobile operating system such as operating system 514 to facilitate functionality described herein.

The applications 520 may utilize built in operating system functions (e.g., kernel 528, services 530, and/or drivers 532), libraries (e.g., system 534, APIs 536, and other libraries 538), and frameworks/middleware 518 to create user interfaces to interact with users of the system. Alternatively, or additionally, in some systems, interactions with a user may occur through a presentation layer, such as presentation layer 544. In these systems, the application/module "logic" can be separated from the aspects of the application/module that interact with a user.

Some software architectures utilize virtual machines. In the example of FIG. 5, this is illustrated by virtual machine 548. A virtual machine creates a software environment where applications/modules can execute as if they were executing on a hardware machine (such as the machine of FIG. 6, for example). A virtual machine is hosted by a host operating system (operating system 514 in FIG. 6) and typically, although not always, has a virtual machine monitor 546, which manages the operation of the virtual machine as well as the interface with the host operating system (i.e., operating system 514). A software architecture executes within the virtual machine such as an operating system 550, libraries 552, frameworks/middleware 554, applications 556 and/or presentation layer 558. These layers of software architecture executing within the virtual machine 548 can be the same as corresponding layers previously described or may be different.

Example Machine Architecture and Machine-Readable Medium

Figure 6:
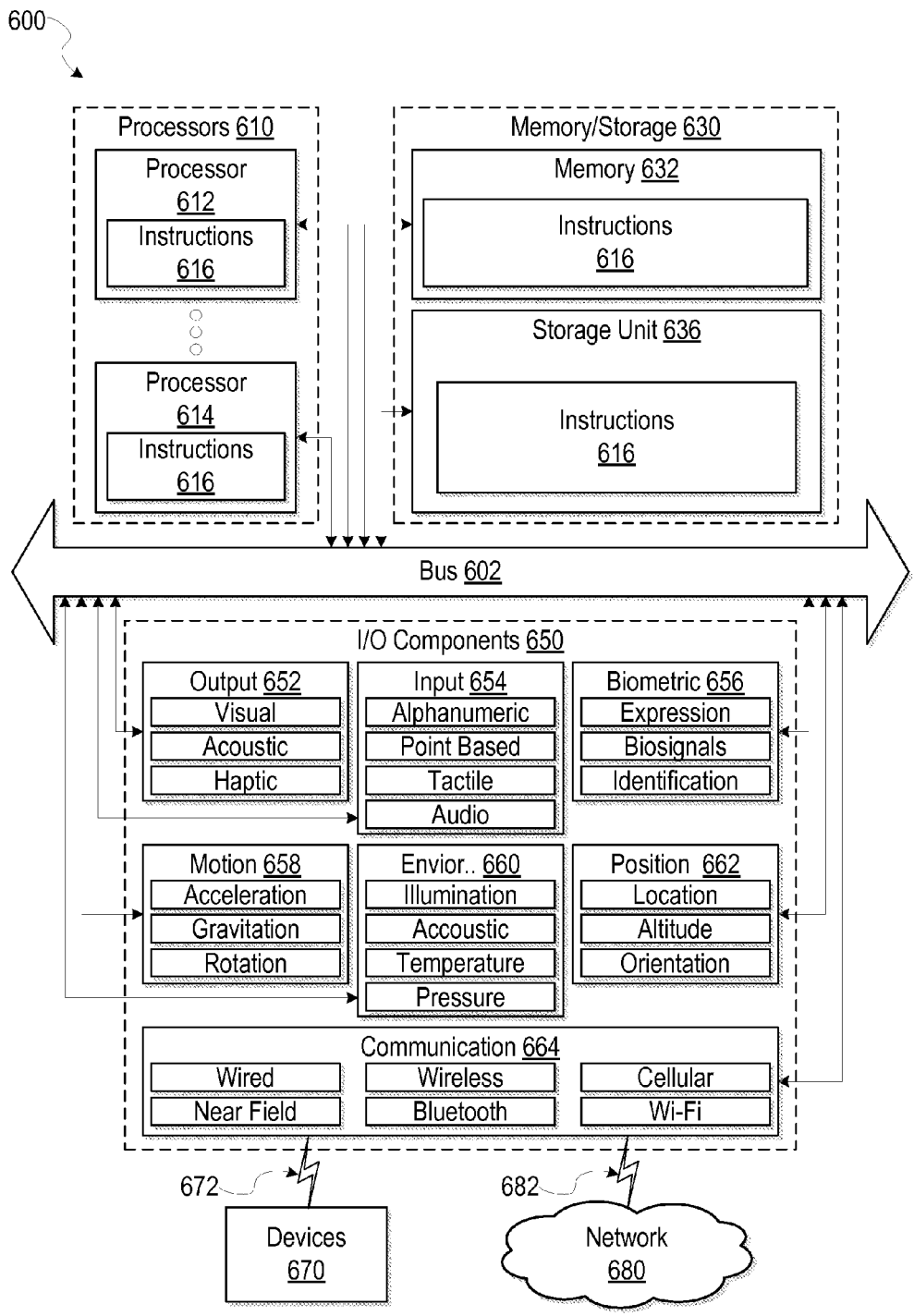
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example the instructions may cause the machine to execute the flow diagrams of FIGS. 1-4. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 612 and processor 614 that may execute instructions 616. The term "processor" is intended to include multi-core processors that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672, respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of invisible two-factor authentication comprising:
   receiving, at a first machine, a registration request from a second machine, the registration request encrypted using a common hash key;
   generating, in response to the receiving of the registration request, a server key that is unique to the first machine and to the second machine;
   encrypting the server key using the common hash key;
   responding to the registration request with the server key encrypted using the common hash key;
   receiving encrypted data from the first machine; and
   decrypting the encrypted data using the server key.

2. The method of claim 1, further comprising periodically regenerating the server key and communicating the server key to the second machine, encrypted using the common hash key.

3. The method of claim 1, further comprising receiving a shared key from the second machine and denying registration of the second machine if the shared key does not match a shared key stored by the first machine.

4. The method of claim 1, wherein the registration request includes a timestamp and the method further comprises verifying that the timestamp in the registration request occurs before a current date and time as measured by the second machine.

5. The method of claim 1, further comprising modifying the common hash key using a salt.

6. A system for returning search results in an online computer system, the system comprising:
   a computer readable medium having instructions stored there on, which, when executed by a processor, cause the system to:
   receive, at a first machine, a registration request from a second machine, the registration request encrypted using a common hash key;
   generate, in response to the receiving of the registration request, a server key that is unique to the first machine and to the second machine;
   encrypt the server key using the common hash key;
   respond to the registration request with the server key encrypted using the common hash key;
   receive encrypted data from the first machine; and
   decrypt the encrypted data using the server key.

7. The system of claim 6, further comprising periodically regenerating the server key and communicating the server key to the second machine, encrypted using the common hash key.

8. The system of claim 6, further comprising receiving a shared key from the second machine and denying registration of the second machine if the shared key does not match a shared key stored by the first machine.

9. The system of claim 6, wherein the registration request includes a timestamp and the method further comprises verifying that the timestamp in the registration request occurs before a current date and time as measured by the second machine.

10. The system of claim 6, further comprising modifying the common hash key using a salt.

11. A non-transitory machine-readable storage medium comprising instructions, which when implemented by one or more machines, cause the one or more machines to perform operations comprising:
    receiving, at a first machine, a registration request from a second machine, the registration request encrypted using a common hash key;
    generating, in response to the receiving of the registration request, a server key that is unique to the first machine and to the second machine;
    encrypting the server key using the common hash key;
    responding to the registration request with the server key encrypted using the common hash key;
    receiving encrypted data from the first machine; and
    decrypting the encrypted data using the server key.

12. The non-transitory machine-readable storage medium of claim 11, further comprising periodically regenerating the server key and communicating the server key to the second machine, encrypted using the common hash key.

13. The non-transitory machine-readable storage medium of claim 11, further comprising receiving a shared key from the second machine and denying registration of the second machine if the shared key does not match a shared key stored by the first machine.

14. The non-transitory machine-readable storage medium of claim 11, wherein the registration request includes a timestamp and the method further comprises verifying that the timestamp in the registration request occurs before a current date and time as measured by the second machine.

15. The non-transitory machine-readable storage medium of claim 11, further comprising modifying the common hash key using a salt.

* * * * *